July 29, 1930.   C. D. FINLEY   1,771,751
PISTON
Filed Aug. 2, 1926
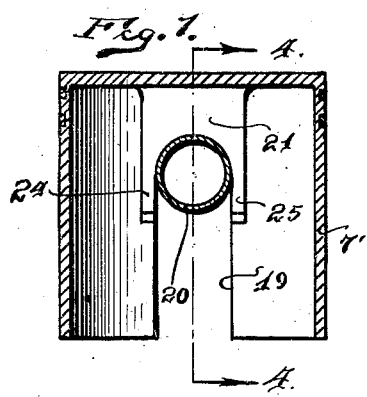
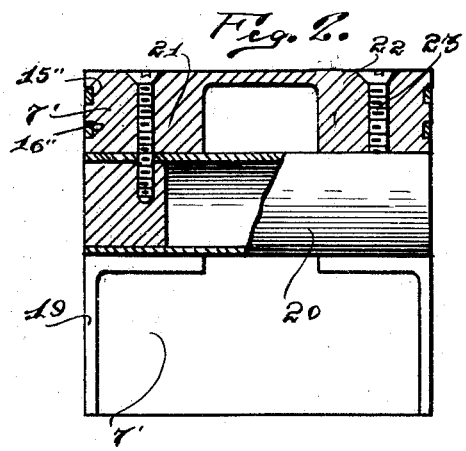
INVENTOR.
Clarence D. Finley
BY
ATTORNEY.

Patented July 29, 1930

1,771,751

UNITED STATES PATENT OFFICE

CLARENCE D. FINLEY, OF DETROIT, MICHIGAN

PISTON

Application filed August 2, 1926. Serial No. 126,381.

My invention relates to a new and useful improvement in a piston adapted for use in internal combustion engines and other engines in which a reciprocating piston is mounted in a cylinder, and provided with sealing means for engaging the walls of the cylinder.

The present invention has as its object the provision of a structure, whereby the sealing rings may be easily and quickly removed with a minimum amount of labor and without taking down the engine.

Another object of the invention is the provision of a cylinder having a ring bearing portion, readily removable from the cylinder and detachable from the driving connections of the piston.

Other objects will appear hereinafter.

The invention consists in the combination and arrangement of parts hereinafter described and claimed.

The invention will be best understood by a reference to the accompanying drawings which form a part of this specification and in which, Fig. 1 is a central vertical sectional view of the invention.

Fig. 2 is a sectional view showing a part in side elevation, taken on substantially line 4—4 of Fig. 1.

In the drawings I have shown the invention on a piston which is formed from a single piece 7' having recesses or peripheral grooves 15" and 16" in which the piston rings may engage. Axially extending slots 19 are formed in the side walls of the piston 7' at diametrically opposite points to permit the positioning of the piston 7' on the wrist pin 20, this piston being moved axially into position on the wrist pin. The top of the piston 7' is provided with inwardly projecting bosses 21 and 22, through which screws 23 may be projected for threading into the wrist pin 20, so that the screws serve to attach the piston 7' to the wrist pin.

It is evident that upon an unthreading of the screws 23, the piston 7' may be removed from the cylinder and replaced therein when desired. Bearing forming portions 24 and 25 project inwardly from the top of the piston and serve to embrace the wrist pin 20 at its opposite sides.

While I have illustrated and described the preferred form of structure, I do not wish to limit myself to the precise form of structure shown, but desire to avail myself of such variations and modifications as may come within the scope of the appended claims.

Having thus described my invention what I claim is new and desire to secure by Letters Patent is:

1. A piston of the class described comprising: a main body having peripheral grooves formed therein adjacent its upper end; sealing rings mounted in said grooves; axially extending, diametrically positioned slots on each side of said main body portion projecting from the lower end well toward the upper end thereof; diametrically positioned bosses projecting inwardly from the upper end of said piston and each extending downwardly for a distance on opposite sides of said axially extending slots, each of said bosses having an opening formed therein for the projection of a screw therethrough; a wrist pin engaging in said slots and positioned between the downwardly projecting portions of said bosses, said slots throughout their length being of a width corresponding to the diameter of said wrist pin; and a screw projected through said openings and threaded into said wrist pin, said screws serving as the sole means for connecting said wrist pin to said piston.

2. A cup-shaped piston of the class described having its upper end closed and provided with axially extended slots diametrically positioned and extending from the open end well toward the closed end thereof; a pair of diametrically opposite bosses on the inner side of said piston in alignment with said slots; a wrist pin engaging in said slots; and threaded means projected through said bosses and threaded into said pin, said threaded means being the sole means of attaching said piston to said wrist pin, said slots being of a width throughout their length corresponding to the diameter of said wrist pin.

In testimony whereof I have signed the foregoing.

CLARENCE D. FINLEY.